Figure 1:
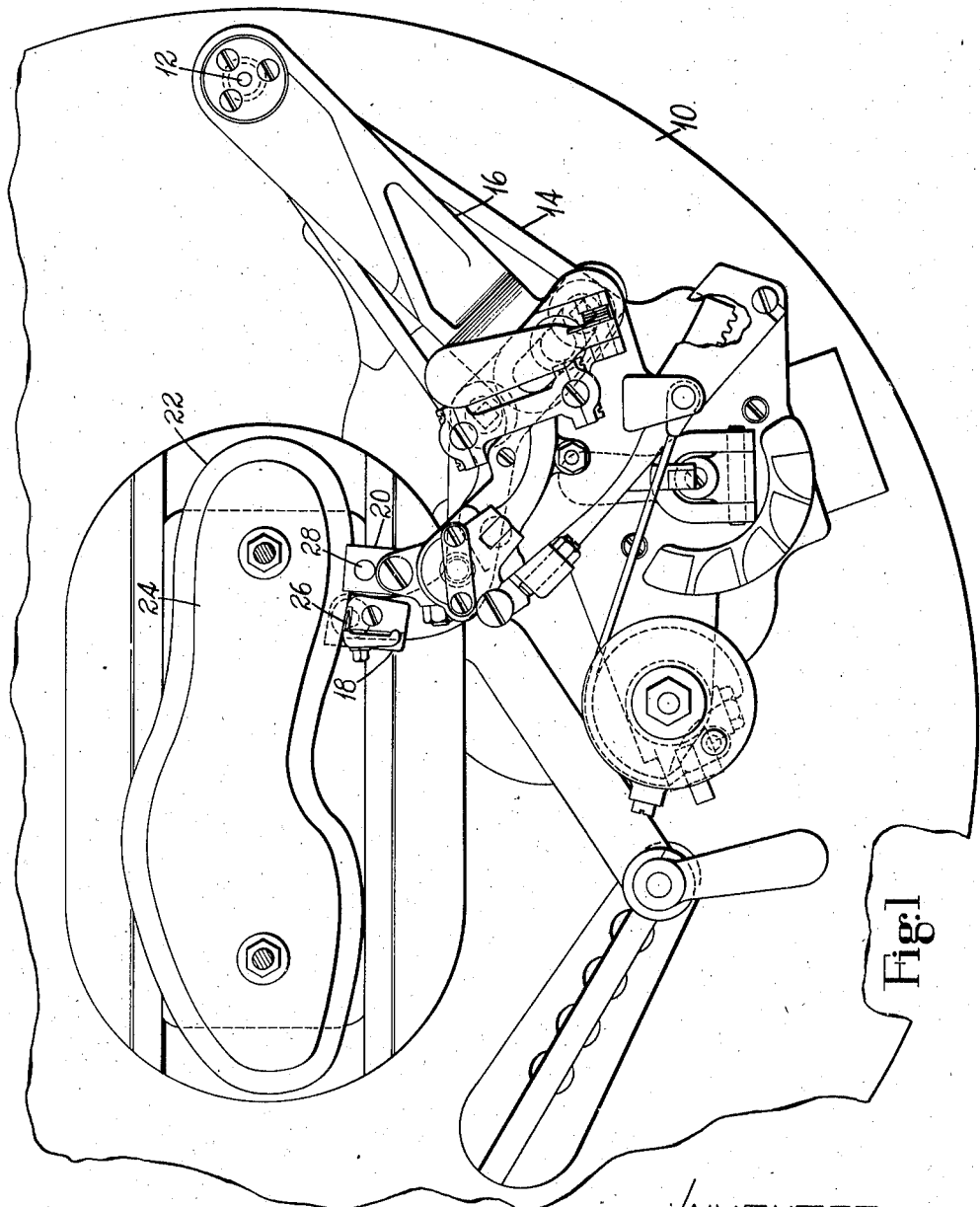

July 20, 1943. R. W. CUMMINGS 2,324,562
METHOD OF AND MEANS FOR ROUNDING WORKPIECES
Filed Jan. 6, 1942 2 Sheets-Sheet 1

INVENTOR
Roy W. Cummings
By his attorney

July 20, 1943.   R. W. CUMMINGS   2,324,562
METHOD OF AND MEANS FOR ROUNDING WORKPIECES
Filed Jan. 6, 1942   2 Sheets-Sheet 2
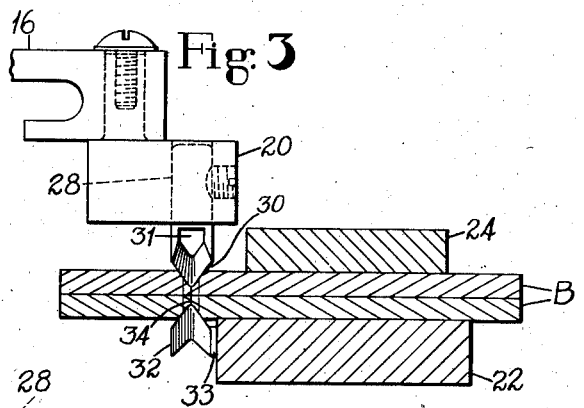
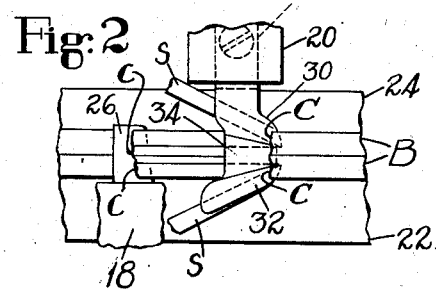
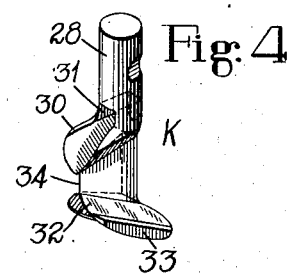
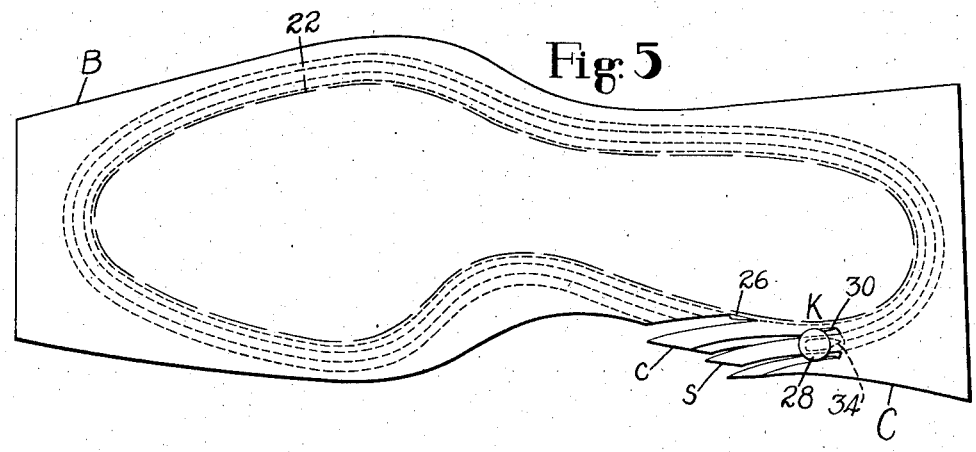
INVENTOR
Roy W. Cummings
By his Attorney Patented July 20, 1943

2,324,562

UNITED STATES PATENT OFFICE 2,324,562

METHOD OF AND MEANS FOR ROUNDING WORKPIECES

Roy W. Cummings, Beverly, Mass., assignor to United Shoe Machinery Corporation, Flemington, N. J., a corporation of New Jersey Application January 6, 1942, Serial No. 425,760

16 Claims. (Cl. 12—25)

This invention relates to the rounding or cutting to form of work-pieces, it being especially applicable to the production of soles for shoes, as insoles or outsoles.

In the rounding of work-pieces by the action upon them of a drag-knife, such as is employed in the well known planet sole rounding machine, the excess of blank-area over that of the finished piece produces a chip or waste-strip of differing widths. As the knife advances, it must free itself from this strip by forcing it outwardly. This produces a very considerable resistance to the cutting action, varying with the character and weight of the stock and with the degree of curvature of the pattern which guides the knife. In overcoming this resistance caused by the clearing of the chip, a substantial force other than that necessary to sever the blank must be applied. This may have the effect of displacing the work from the clamping means, or, if the stock is soft, may stretch it away from the pattern. In either case, the piece cut will not correspond in contour to that of said pattern. It is an object of my invention to eliminate largely the chip-resistance, and thus allow the knife to follow the pattern accurately and to operate upon stock of increased thickness during an operating cycle.

A feature of the invention, whereby this object is attained, lies in a method of rounding in which a blank of sheet-material is cut along a line following the general contour of the finished piece, as a shoe-sole, to divide from the margin of the sheet a peripherally extending chip, such cut leaving a projecting margin, and then cutting the blank to remove the margin. The two cuts are made during an uninterrupted rounding operation. The sole-blank may be clamped with a pattern, and relative movement between the work and a knife or cutting device of the drag-type caused to cut the blank under the guidance of the pattern to sole-form but larger than the finished sole, the work being completed by cutting the blank under the guidance of the pattern to produce the finished sole. It is preferable to make these roughing and finishing cuts simultaneously by cutting devices arranged at different distances from the pattern and at different points about its periphery. By thus proceeding, the first cut may remove a waste-piece, the width of which does not impose upon the knife undue lateral resistance. The same is true of the second cut, with the result that no excessive displacing force need be applied to the work, which will correspond accurately to the form of the pattern. In this way, work of considerable thickness may be operated upon successfully. The first or roughing cut may be made by grooving the blank at opposite sides, and dividing it by cutting between the inner sides of the grooves. By thus operating, the lateral resistance is minimized, and a chip of considerable width may readily be removed.

Another feature of the invention may be found in a machine capable of utilization in the performance of my improved method. I combine with a pattern having a single peripheral guiding surface and against which a blank for a shoe-sole or other work-piece may be clamped for the rounding operation, cutting means acting during each operating cycle of the machine at different distances from the pattern and under its guidance, to first cut from the blank a peripheral chip and then to sever the blank to produce the finished work-piece, and means for moving the clamped blank and cutting means relatively to cause the field of operation of the cutting means to shift about the pattern. The cuts are best made by two or more rounding devices, set at different distances from the pattern and at different points about its periphery, they being mounted upon a plurality of revoluble carriers. The first of these devices is shown as arranged to act upon opposite sides of the blank. It is preferably in the form of a tool having grooving blades converging toward each other, and a severing blade interposed between the grooving blades. This tool is made the subject of a divisional application, filed in the United States Patent Office on November 30, 1942, and bearing the Serial No. 467,298.

In the accompanying drawings,

Fig. 1 is a partial top plan view of my improved rounding machine;

Fig. 2, a detail in broken side elevation, showing the two cutting devices;

Fig. 3, a transverse sectional detail, taken just in front of the grooving cutter;

Fig. 4, a perspective view of said grooving cutter; and

Fig. 5, a top plan view of the pattern with a clamped blank and upon which are indicated the roughing and finishing cuts made by the machine.

In Fig. 1 of the drawings appears the rotatable support 10, of that form of the planet sole rounding machine disclosed in Letters Patent of the United States No. 2,057,665, Bertrand, October 20, 1936. Upon this support are pivoted at 12 the lower carrier-arm 14 and the upper carrier-arm 16, revoluble under the influence of the support. Pivoted to turn upon the lower arm is a cutter-block 18, and upon the upper arm a cutter-block 20, the blocks having, if desired, the usual biasing springs. The arms are spring-urged to maintain guide-surfaces upon the blocks 18 and 20 in contact, respectively, with the periphery of a pattern 22. The pattern 22 is separably mounted upon the frame of the machine, and has above it the usual reciprocatory clamp 24. Between the pattern and clamp, one or more blanks B may be held for the rounding operation. In the block 18, the rounding knife 26 is secured. This may be the ordinary drag-knife, except that it may be lengthened to provide for operation upon a greater thickness of work than is customary.

Considering now that portion of the machine peculiar to this invention, the block 20, pivoted in the arm 16, has fixed in it vertically the shank 28 of a cutting device K (Fig. 4), which is, in effect, a compound drag-knife. Projecting forwardly from the shank in a downwardly inclined direction toward its cutting edge, is a grooving blade 30, which may be transversely of V-shape with its apex at the bottom. An opening 31 through the shank (Fig. 3) permits material removed from the work by the blade to be discharged freely. Below and opposite the blade 30, and converging forwardly and upwardly toward it, is a like blade 32. This blade is inverted so the apices of the two blades are adjacent, and it is shown as carried by an interposed severing blade 34, which may be integral with the two grooving blades. The cutting edge of the blade 34 extends between the blades 30 and 32, just at the rear of their apices. From the blade 32 is a lateral extension 33, which furnishes the pattern-engaging surface for the cutter-block 20.

As is best shown in Fig. 5, the cutting device K is held by the engagement of the contact-surface of its blade 32 with the pattern 22, so that it acts upon the clamped blank or blanks B along a path farther removed from the periphery of the pattern than does the knife 26. It is also in advance of said knife, considered in the direction in which it is carried in the rotation of the support 10. Referring to Figs. 2 and 3, it may be seen that the blades 30 and 32 are so supported that they cut from opposite sides of the blanks along planes substantially equally spaced from the vertical center. The line of operation is such as to follow the general contour of the finished sole, but leaving a margin projecting therefrom. Each of the blades produces in one side of the stack of blanks a groove of considerable depth, the gouged out strings s of material being deflected upwardly from the blade 30 through the opening 31 and downwardly along the blade 32. The lateral resistance offered to the advance of the grooving blades is relatively slight. After the opposite grooves have been cut, the intermediate blade 34 finds only a comparatively thin layer of material to sever, and, because of this, it is able to displace readily the chip C which is formed, even if this is of considerable width. Since the knife 26, guided by the contact of its block 18 with the pattern 22 and which cuts the work to its finished form, acts upon the blanks after the production of the heavy primary chip C, it is relieved of the necessity for displacing this, and the narrow secondary chip c, consisting of the marginal portion left after the roughing cut of the device K, is severed with little lateral resistance to advance. Consequently, there is slight tendency to shift the clamped blanks between the pattern and clamp, and work of greater thickness may be cut accurately in a single operating cycle of the machine than has heretofore been possible.

Having described my invention, what I claim as new and desire to secure by Letters Patent of the United States is:

1. The method of rounding, which consists in cutting a blank of sheet-material along a line following the general contour of the finished piece to divide from the margin of the sheet a peripherally extending chip, such cut leaving a projecting margin, and cutting the blank to remove the margin, the two cuts being made during an uninterrupted rounding operation.

2. The method of rounding shoe-soles, which consists in clamping together a sole-blank and a pattern, cutting the blank by relative movement between it and a drag-knife under the guidance of contact with the pattern to sole-form but larger than the finished sole, completing the sole by cutting the blank under the guidance of contact with the pattern to produce the finished sole, the cuts producing both the larger and the finished sole-forms being made during continuous relative movement, and separating the rounded sole from the pattern.

3. The method of rounding, which consists in clamping together a blank and a pattern, cutting the blank under the guidance of the pattern to the desired form but larger than the finished piece, and completing the work by cutting the blank under the guidance of the pattern to produce the finished piece, the cuts being made simultaneously.

4. The method of rounding shoe-soles, which consists in clamping together a sole-blank and a pattern, arranging a plurality of drag-knives at different distances from the pattern and at different points about its periphery, and producing relative movement between the clamped work and the knives to cause the points of operation of said knives to shift about the pattern and cut from the blank successive marginal portions.

5. The method of rounding, which consists in grooving a blank along a line following the general contour of but larger than the finished piece, dividing the blank by cutting it through the groove, and again cutting the blank to produce the finished piece.

6. The method of rounding, which consists in grooving a blank at opposite sides along a line following the general contour of but larger than the finished piece, dividing the blank by cutting it between the grooves, and again cutting the blank to produce the finished piece.

7. The method of rounding shoe-soles, which consists in clamping together a sole-blank and a pattern, grooving the blank simultaneously from opposite sides under the guidance of the pattern to cut it to sole-form but larger than the finished sole, and cutting the blank under the guidance of the pattern to produce the finished sole.

8. In a rounding machine, the combination with a pattern against which a blank may be clamped for the rounding operation, of cutting means acting during each operating cycle of the machine at different distances from the pattern and under its guidance to first cut from the blank a peripheral chip and then sever the blank to produce the finished piece, and means for moving the clamped blank and cutting means relatively to each other to carry the field of operation of the cutting means about the pattern.

9. In a rounding machine, the combination with a pattern having a single peripheral guiding surface and against which a blank may be clamped for the rounding operation, of a plurality of rounding devices situated at different distances from the pattern and being under the guidance of its surface, said rounding devices being adapted to cut through the blank and divide therefrom successive marginal portions, and means for moving the clamped blank and rounding devices relatively to each other to carry the points of operation of the devices about the pattern.

10. In a rounding machine, the combination with a pattern having a single peripheral guiding surface and against which a blank may be clamped for the rounding operation, of a plurality of rounding devices situated at different distances from the pattern and at different points about its periphery and being under the guidance of its surface, said rounding devices being adapted to cut through the blank and divide therefrom successive marginal portions, and means for moving the clamped blank and rounding devices relatively to each other to carry the points of operation of the devices about the pattern.

11. In a rounding machine, the combination with a pattern having a single peripheral guiding surface and against which a blank may be clamped for the rounding operation, a rounding device spaced from the pattern to sever the blank by a roughing cut, a rounding device situated nearer the pattern to sever the blank by a finishing cut, both rounding devices being under the guidance of the single peripheral surface of said pattern, and means for moving the clamped blank and rounding devices relatively to each other to carry the points of operation of the devices about the pattern.

12. In a rounding machine, a pattern having a single peripheral guiding surface and with which a blank may be associated, a plurality of carriers revoluble under the guidance of the single peripheral surface of the pattern, and a cutter mounted upon each carrier and adapted to divide from the blank a marginal portion.

13. In a rounding machine, a pattern having a single peripheral guiding surface and with which a blank may be associated, two carriers revoluble under the guidance of the single peripheral surface of the pattern, and a cutter mounted upon each carrier and adapted to divide from the blank a marginal portion, one of the carriers being situated in advance of the other.

14. In a rounding machine, a pattern with which a blank may be associated, a rounding device positioned by the pattern and having blades arranged to act upon opposite sides of the blank and a blade connecting the opposite blades, and means for moving the rounding device and pattern relatively to each other to carry the point of operation of the device about the pattern.

15. In a rounding machine, a pattern with which a blank may be associated, a rounding device positioned by the pattern and having grooving blades arranged to act upon opposite sides of the blank and a severing blade connecting the grooving blades, and means for moving the rounding device and pattern relatively to each other to carry the point of operation of the device about the pattern.

16. In a rounding machine, a pattern with which a blank may be associated, a rounding device positioned by the pattern and having blades arranged to act upon opposite sides of the blank, a second rounding device having a blade acting at the rear of the first and closer to the pattern, and means for moving the rounding devices and pattern relatively to each other to carry the point of operation of the devices about the pattern.

ROY W. CUMMINGS.